US012639519B2

(12) United States Patent
Wagner et al.

(10) Patent No.: US 12,639,519 B2
(45) Date of Patent: May 26, 2026

(54) TRAINING MASKED LANGUAGE MODELS BASED ON PARTIAL SEQUENCES OF TOKENS

(71) Applicant: Microsoft Technology Licensing, LLC, Redmond, WA (US)

(72) Inventors: Andy Wagner, Cupertino, CA (US); Tiyasa Mitra, San Jose, CA (US); Fanny Nina Paravecino, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 443 days.

(21) Appl. No.: 17/334,684

(22) Filed: May 28, 2021

(65) Prior Publication Data

US 2022/0382978 A1      Dec. 1, 2022

(51) Int. Cl.
| | |
|---|---|
| *G06F 40/279* | (2020.01) |
| *G06F 40/284* | (2020.01) |
| *G06F 40/58* | (2020.01) |
| *G06N 3/084* | (2023.01) |

(52) U.S. Cl.
CPC ........... *G06F 40/284* (2020.01); *G06N 3/084* (2013.01)

(58) Field of Classification Search
CPC ........ G06F 40/30; G06F 40/284; G06F 40/20; G06F 40/205; G06F 40/216; G06F 40/242; G06F 40/237; G06F 16/24522; G06F 16/3329; G06F 40/247; G06F 16/3344; G06N 3/08; G06N 3/045; G06N 5/04; G06N 3/044; G06N 20/00; G06N 3/084; G06N 3/02; G06N 3/042; G06N 3/0455
See application file for complete search history.

(56) References Cited

U.S. PATENT DOCUMENTS

| | | | | |
|---|---|---|---|---|
| 11,494,695 | B2 * | 11/2022 | Clark ..................... | G06N 20/00 |
| 2019/0251165 | A1 * | 8/2019 | Bachrach ............... | G06N 3/084 |
| 2021/0027022 | A1 | 1/2021 | Olabiyi et al. | |
| 2021/0089724 | A1 * | 3/2021 | Luong ..................... | G06F 40/40 |
| 2021/0150332 | A1 * | 5/2021 | Truong ................... | G06N 5/04 |
| 2021/0165960 | A1 * | 6/2021 | Eisenschlos .......... | G06F 40/284 |
| 2021/0232753 | A1 * | 7/2021 | He ......................... | G06F 40/126 |
| 2021/0264109 | A1 * | 8/2021 | Srinivasan .............. | G06F 40/44 |
| 2021/0312628 | A1 * | 10/2021 | Larlus-Larrondo ....... | G06T 7/73 |

(Continued)

OTHER PUBLICATIONS

Devlin Jet al, "Bert: Pre-training of deep bidirectional transformers for language understanding:", 2018, in arXiv preprint arXiv: 1810. 04805. Oct. 11, 2018, pp. 4171-4186.*

(Continued)

*Primary Examiner* — Olujimi A Adesanya
(74) *Attorney, Agent, or Firm* — Holzer Patel Drenann

(57) ABSTRACT

Embodiments of the present disclosure include systems and methods for training masked language models based on partial sequences of tokens. A sequence of tokens for training a transformer model is received. A defined proportion of the sequence of tokens is selected. Each value of the defined proportion of the sequence of tokens is replaced with a defined value. The transformer model is trained by using the sequence of tokens to train the transformer model during a forward pass and using a subset of the sequence of tokens that includes the defined the proportion of the sequence of tokens to train the transformer model during a backward pass.

11 Claims, 10 Drawing Sheets

(56) References Cited

U.S. PATENT DOCUMENTS

| | | | | |
|---|---|---|---|---|
| 2021/0319288 A1* | 10/2021 | Wagner | ............. | G06F 40/289 |
| 2021/0357187 A1* | 11/2021 | Clement | ............. | G06F 8/33 |
| 2021/0365723 A1* | 11/2021 | Wagner | ............. | G06F 40/30 |
| 2022/0027576 A1* | 1/2022 | Wagner | ............. | G06N 3/084 |
| 2022/0027719 A1* | 1/2022 | Wagner | ............. | G06F 16/243 |
| 2022/0076127 A1* | 3/2022 | Wagner | ............. | G06N 3/082 |
| 2022/0108162 A1* | 4/2022 | Wagner | ............. | G06N 3/08 |
| 2022/0129626 A1* | 4/2022 | Liu | ............. | G06N 3/045 |
| 2022/0164655 A1* | 5/2022 | Gomez | ............. | G06N 3/0499 |
| 2022/0237378 A1* | 7/2022 | El Asri | ............. | G06F 40/284 |
| 2022/0237466 A1* | 7/2022 | Gomez | ............. | G06N 3/098 |
| 2022/0277141 A1* | 9/2022 | Nijkamp | ............. | G06F 40/295 |

OTHER PUBLICATIONS

Clark et al, "Electra: Pre-training text encoders as discriminators rather than generators", Mar. 2020, arXiv preprint arXiv:2003. 10555. Mar. 23, 2020, pp. 1-18.*

Chen et al, "Distilling knowledge learned in BERT for text generation", 2019, arXiv preprint arXiv:1911.03829. Nov. 10, 2019, pp. 1-13.*

Song et al, "Mass: Masked sequence to sequence pre-training for language generation", 2019, arXiv preprint arXiv:1905.02450. May 7, 2019.*

Bao et al, "Pseudo-masked language models for unified language model pre-training", Nov. 2021,. InInternational conference on machine learning Nov. 21, 2020 (pp. 642-652). PMLR.*

Babić, et al, "Survey of neural text representation models", Oct. 2020 Information, vol. 11, No. 11, pp. 1-32, 2020.*

Zhang et al, "Accelerating training of transformer-based language models with progressive layer dropping", Dec. 2020, Advances in Neural Information Processing Systems. 2020;33:14011-23. (Year: 2020).*

"International Search Report and Written Opinion Issued in PCT Application No. PCT/US22/027739", Mailed Date: Jul. 27, 2022, 11 Pages.

* cited by examiner

100

105 Input Data Processor

110 Transformer Module

115 Output Data Processor

| Tokens 505 | Position Values 510 | Sentence Values 515 |
|---|---|---|
| STRT | 0 | 0 |
| To | 1 | 0 |
| Be | 2 | 0 |
| Or | 3 | 0 |
| Not | 4 | 0 |
| To | 5 | 0 |
| Be | 6 | 0 |
| SEP | 7 | 0 |
| That | 8 | 1 |
| Is | 9 | 1 |
| The | 10 | 1 |
| Question | 11 | 1 |
| SEP | 12 | 1 |

| Tokens 505 | STRT | To | Be | MASK | Not | To | Be | SEP | That | Is | The | MASK | SEP |
|---|---|---|---|---|---|---|---|---|---|---|---|---|---|
| Position Values 510 | 0 | 1 | 2 | 3 | 4 | 5 | 6 | 7 | 8 | 9 | 10 | 11 | 12 |
| Sentence Values 515 | 0 | 0 | 0 | 0 | 0 | 0 | 0 | 0 | 1 | 1 | 1 | 1 | 1 |
| Token Labels 605 | | | | Or | | | | | | | | Question | |

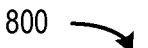

800

810   Receiving a sequence of tokens for training a transformer model

820   Selecting a defined proportion of the sequence of tokens

830   Replacing each value of the defined proportion of the sequence of tokens with a defined value 840   Training the transformer model by using the sequence of tokens to train the transformer model during a forward pass and using a subset of the sequence of tokens that includes the defined the proportion of the sequence of tokens to train the transformer model during a backward pass

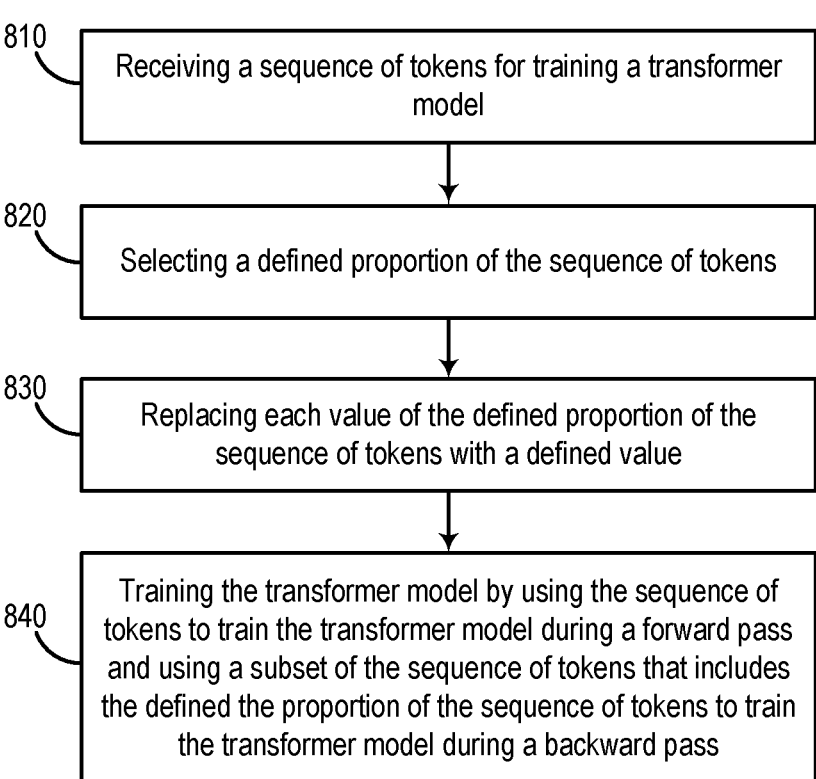

*FIG. 8*

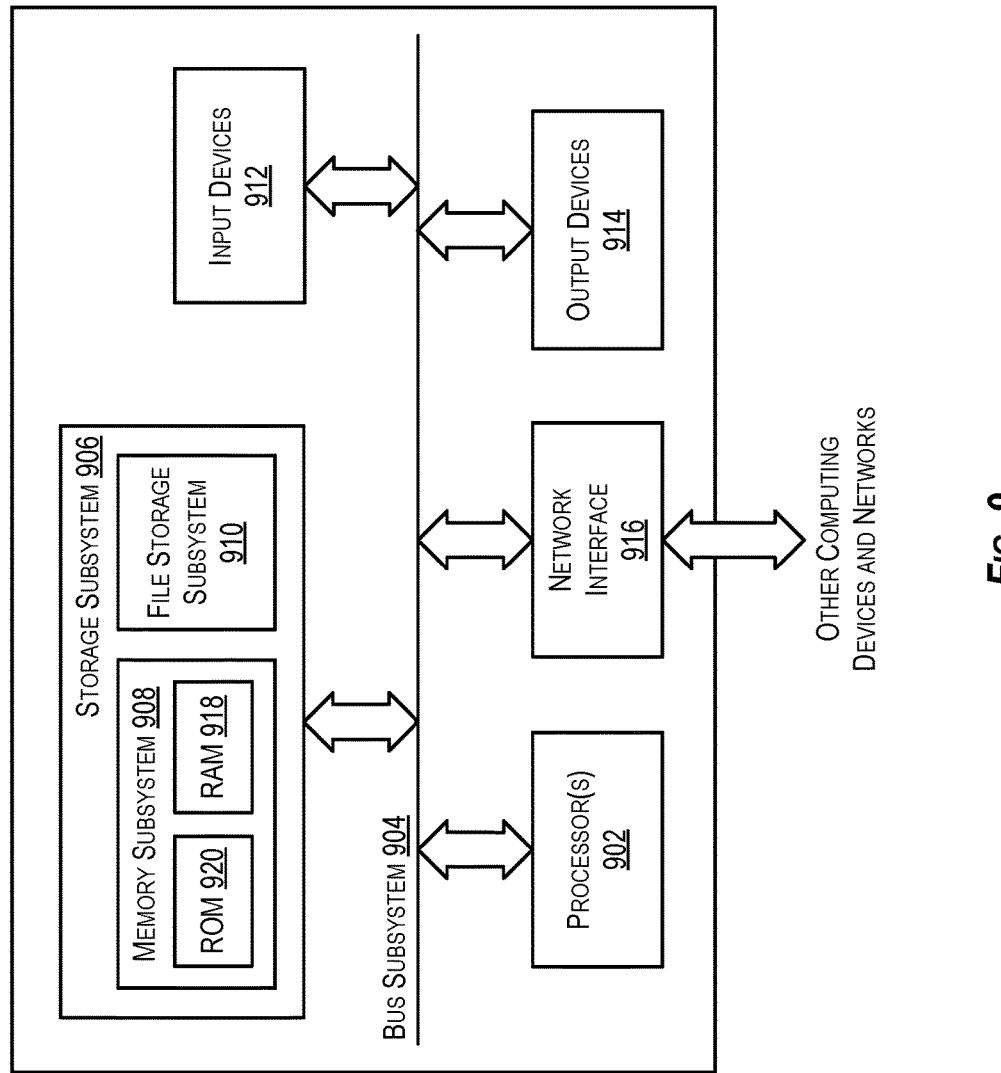
FIG. 9

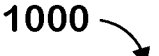
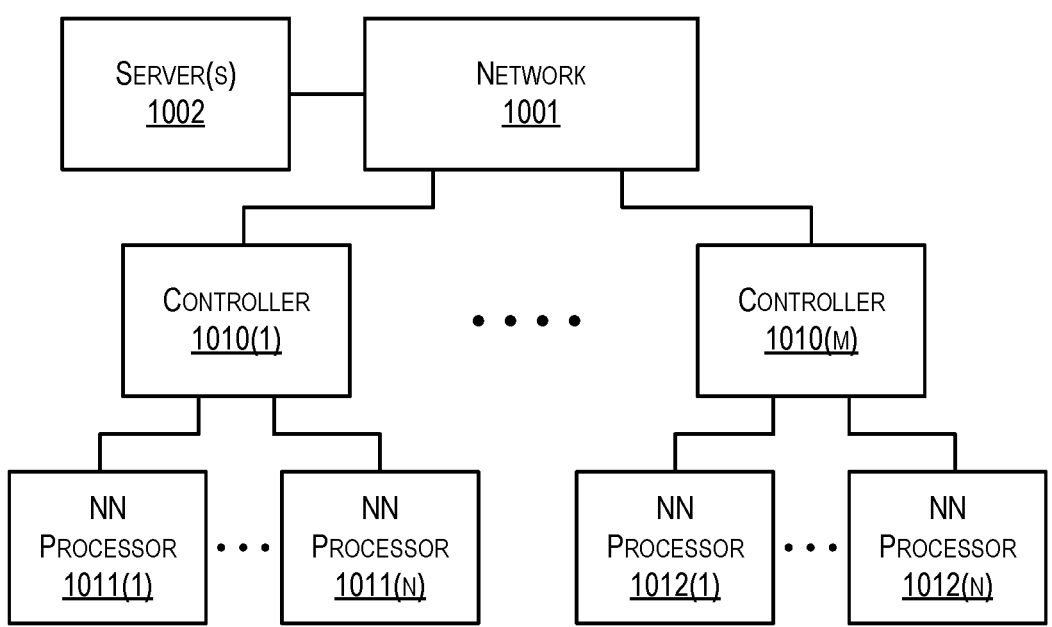
*FIG. 10*

TRAINING MASKED LANGUAGE MODELS BASED ON PARTIAL SEQUENCES OF TOKENS

BACKGROUND

The present disclosure relates to computing hardware. More particularly, the present disclosure relates to techniques for training neural networks.

Natural-language understanding (NLU) is a subfield of natural-language processing (NLP) in artificial intelligence that addresses comprehension by computers of the structure and meaning of human language. NLU enables voice technology, search engines, and machine translation to deduce what a user means, regardless of the way it is expressed A neural network is a machine learning model that underpins NLU applications. A neural network is trained for a particular purpose by running datasets through it, comparing results from the neural network to known results, and updating the network based on the differences.

BRIEF DESCRIPTION OF THE DRAWINGS

Various embodiments of the present disclosure are illustrated by way of example and not limitation in the figures of the accompanying drawings.

FIG. 5 illustrates an example input data according to some embodiments.

FIG. 6 illustrates the input data illustrated in FIG. 5 with some tokens masked according to another embodiment.

FIG. 8 illustrates a process for training a masked language model according to some embodiments.

FIG. 9 depicts a simplified block diagram of an example computer system according to some embodiments.

FIG. 10 illustrates a neural network processing system according to some embodiments.

DETAILED DESCRIPTION

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident to one skilled in the art, based on the language of the different claims, that the claimed subject matter may include some or all of the features in these examples, alone or in combination, and may further include modifications and equivalents of the features and techniques described herein.

Described here are techniques for training masked language models based on partial sequences of tokens. In some embodiments, a masked language model may be implemented by a neural network. A computing system can be configured to train such a masked language model by providing sequences of tokens (e.g., sentences of words) as input to the masked language model. Before feeding a sequence of tokens to the masked language model, the computing system randomly selects a defined portion (e.g., 10%, 15%, 20%, etc.) of the sequence of tokens and masking the selected tokens. The masked language model is configured to predict the masked tokens based on the other tokens in the sequence (also referred to as non-masked tokens). Based on the predictions of the masked tokens and the actual values of the masked tokens, the computing system calculates loss values for the masked tokens. The computing system uses these loss values to adjust weights of the neural network implementing the masked language model.

The techniques described in the present application provide a number of benefits and advantages over conventional methods of training masked language models. For instance, by using loss values calculated for masked tokens to adjust weights in the neural network of a masked language model, the masked language model can be trained faster thereby reducing the amount of time it takes to train masked language models. Conventional approaches may use loss values calculated for all tokens in the sequence to adjust weights in the neural network of the masked language model.

Figure 1:
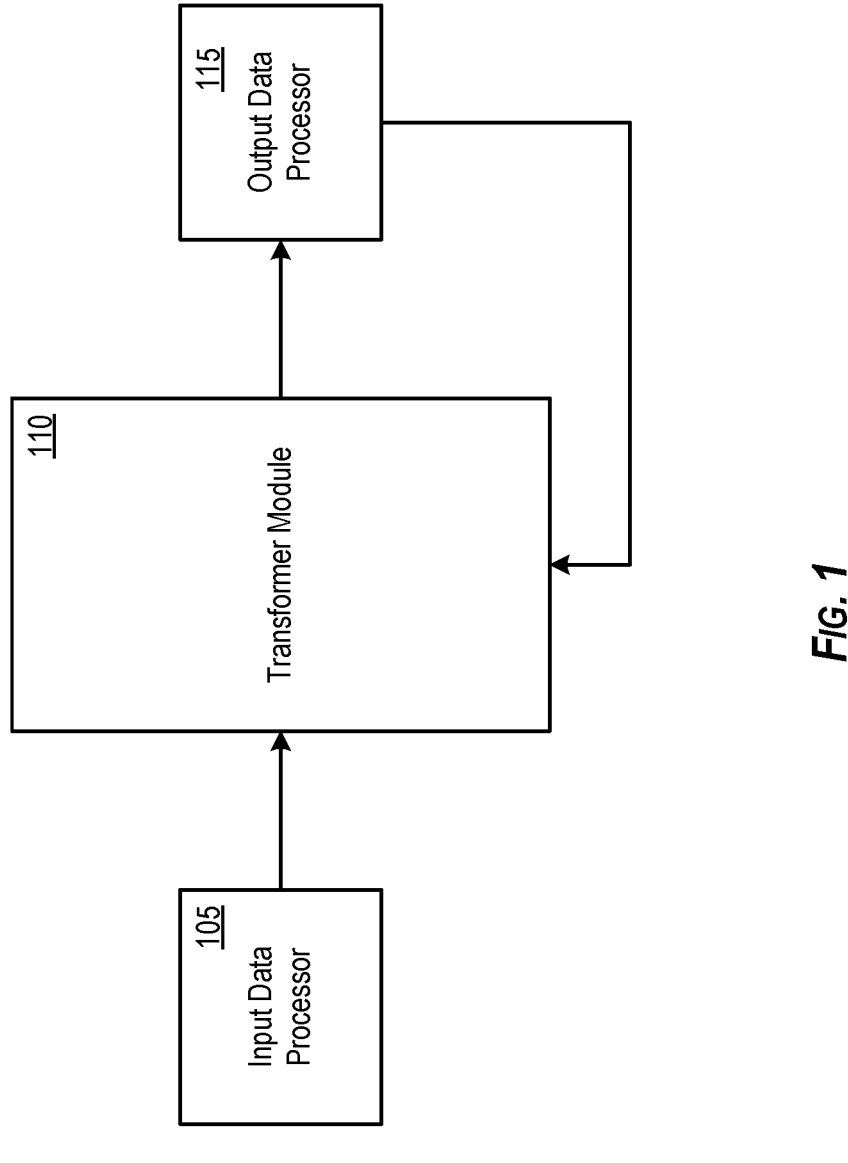
FIG. 1 illustrates a system for training a transformer model according to some embodiments.

FIG. 1 illustrates a system 100 for training a transformer model according to some embodiments. As shown, system 100 includes input data processor 105, transformer module 110, and output data processor 115. Input data processor 105 is configured to process input data used for training transformer module 110. For example, input data processor 105 may receive a set of input data that includes a sequence (e.g., a set of sentences) of tokens (e.g., words) and position values for the sequence of tokens. In some embodiments, a position value represents the relative position of a particular token in a sequence of tokens. In some cases, a set of input data can also include a set of sentence values. In some embodiments, a sentence value represents a sentence to which a token in the sequence of tokens belongs.

Next, input data processor 105 can select a defined number of tokens in the sequence of tokens or a defined proportion of the sequence of tokens (e.g., a percentage of the total number tokens in the sequence). In some embodiments, input data processor 105 selects tokens in the sequence randomly. Input data processor 105 then replaces the selected tokens with a defined token value. The defined value can indicate that a token is a masked token. The selection and replacement of tokens may also referred to as token masking.

After masking tokens in the input data, input data processor 105 may determine token embeddings for each unmasked token in the sequence of tokens using an embedding space generated from a corpus of tokens (e.g., a vocabulary of words). In some embodiments, a token embedding space maps tokens in the corpus, which has many dimensions, to numeric representations (e.g., vectors) having a lower number of dimensions. Then, input data processor 105 can determine position embeddings for each position value in the set of position values using an embedding space generated from a corpus of position values. In some embodiments, a position value embedding space maps position values in the corpus, which has many dimensions, to numeric representations (e.g., vectors) having a lower number of dimensions. In cases where the input data includes sentence values, input data processor 105 may determine sentence embeddings for each sentence value in the set of sentence values using an embedding space generated from a corpus of sentence values. In some embodiments, a sentence value embedding space maps sentence values in the corpus, which has many dimensions, to numeric representations (e.g., vectors) having a lower number of dimensions. After determining embeddings for tokens, position values, and/or sentence values, input data processor 105 calculates an aggregate embedding for each token in the sequence of tokens by adding the token embedding, the corresponding position value embedding, and/or the corresponding sentence value embedding together. Finally, input data processor 105 sends the aggregate embeddings to transformer module 110 for training.

Transformer module 110 is responsible for predicting masked tokens for a given input data that includes unmasked tokens, masked tokens, and position values. In some embodiments, transformer module 110 is implemented by a transformer neural network (also referred to as a transformer or a transformer model). In some such embodiments, a transformer neural network has a sequence-to-sequence architecture. That is, the transformer neural network can transform a given sequence of elements, such as the sequence of words in a sentence, into another sequence. In some embodiments, the transformer neural network includes weights used for predicting masked tokens. The transformer neural network can adjust these weights based on feedback (e.g., differences between predicted tokens for masked tokens and actual values of masked tokens, etc.) received from output data processor 115 using a back propagation technique.

Transformer module 110 may determine relationships/correlations between tokens in input data. For instance, transformer module 110 can process tokens in relation to all the other tokens in a sequence, instead of one-by-one in order. In other words, transformer module 110 considers the full context of a token by looking at the tokens that come before and after it. Transformer module 110 may be used for machine translation and search (e.g., conversational queries). Other applications of transformer module 110 include: document summarization, document generation, named entity recognition (NER), speech recognition, and biological sequence analysis.

Output data processor 115 is configured to process data output from transformer module 110. For example, output data processor 115 can receive an array of data from transformer module 110 and label data. The array of data may include a numeric representation (e.g., the aggregate embedding described above) for each token in a sequence of tokens used as input to transformer module 110. The label data can include values of masked tokens in the input data. Next, output data processor 115 identifies the numeric representations of masked tokens in the array of data and determines the predicted tokens for the masked tokens. Output data processor 115 then determines the differences between the predicted tokens for masked tokens and the actual values of the masked tokens specified in the label data. Finally, output data processor 115 sends the calculated differences back to transformer module 110 to adjust the weights of transformer module 110.

Figure 2:
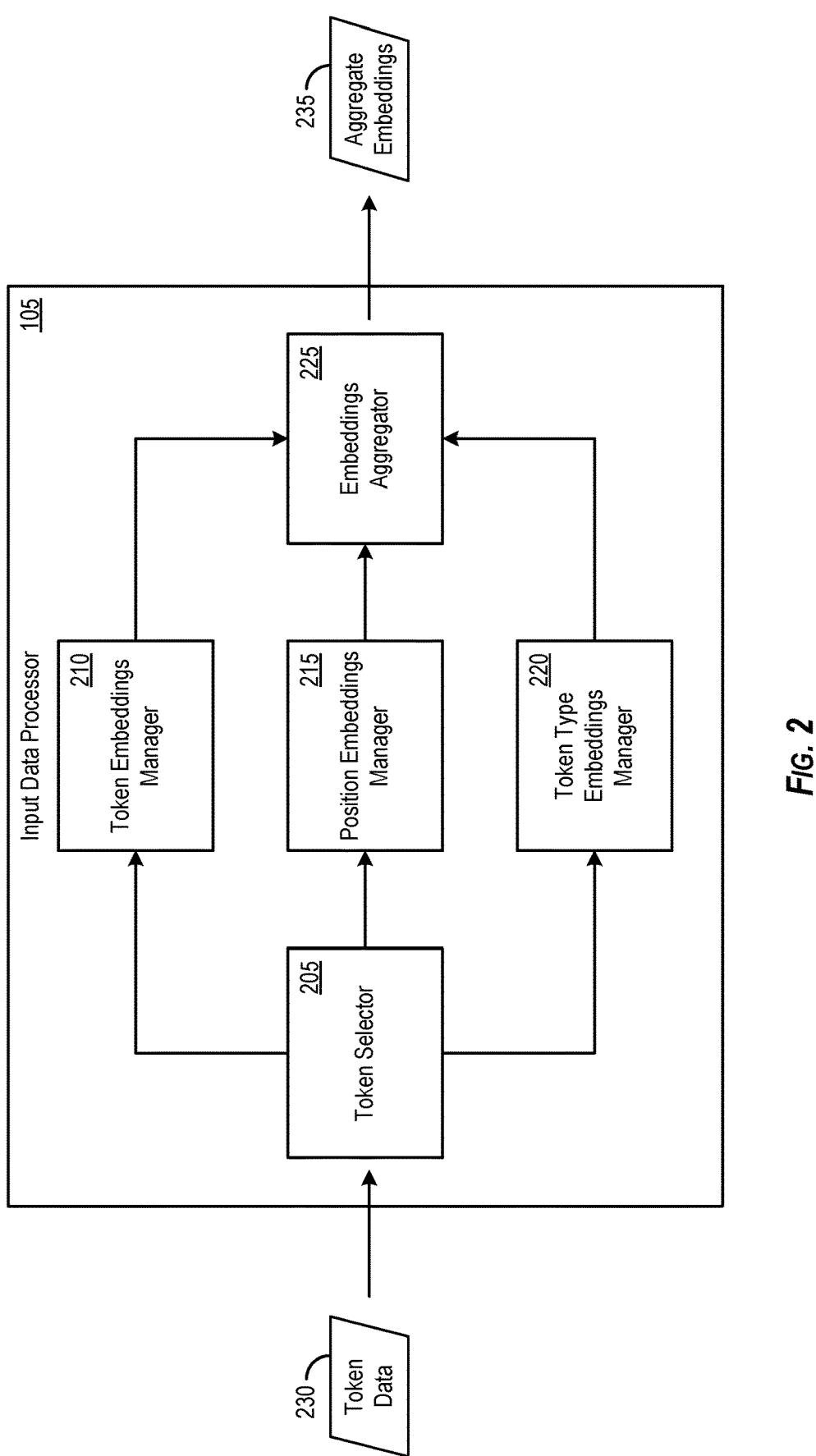
FIG. 2 illustrates an architecture of the input data processor illustrated in FIG. 1 according to some embodiments.

FIG. 2 illustrates an architecture of input data processor 105 according to some embodiments. As shown, input data processor 105 includes token selector 205, token embeddings manager 210, position embeddings manager 215, token type embeddings manager 220, and embeddings aggregator 225. Token selector 205 is configured to select tokens in input data and masks them. In some embodiments, token selector 205 selects tokens randomly. As illustrated in FIG. 2, token selector 205 receives token data 230, which is a sequence of tokens in this example, as input data. As mentioned above, the input data that input data processor 105 receives can include position values and sentence values. After selecting tokens to be masked, token selector 205 replaces the selected tokens with a special token that has a defined value for indicating that the token is a masked token. For the masked tokens, token selector 205 adds label data to the input data that includes the actual values of the masked tokens. Next, token selector 205 sends the input data to token embeddings manager 210, position embeddings manager 215, and token type embeddings manager 220 as depicted in FIG. 2.

Token embeddings manager 210 is responsible for determining token embeddings for tokens in input data. For example, upon receiving input data from token selector 205, token embeddings manager 210 converts each token in the input data to a numeric representation using an embedding space generated from a corpus of tokens. The numeric representation of a token can be a vector of 128, 256, 1024, 2048, 4096, etc. floating-point numbers. In some embodiments, the token embedding space is implemented as a table with entries that map tokens to their corresponding numeric representations. To determine the numeric representation of a particular token in some such embodiments, token embeddings manager 210 performs a look up on the table to find an entry that matches the token and converts the token to the numeric representation specified by the entry. Once token embeddings manager 210 determines numeric representations for each token in the input data, token embeddings manager 210 sends them to embeddings aggregator 225.

Position embeddings manager 215 is configured to determining position embeddings for position values in input data. For instance, when position embeddings manager 215 receives input data from token selector 205, position embeddings manager 215 converts each position value in the input data to a numeric representation using an embedding space generated from a corpus of position values. The numeric representation of a position value may be a vector of 128, 256, 1024, 2048, 4096, etc. floating-point numbers. In some embodiments, the position value embedding space is implemented as a table with entries that map position values to their corresponding numeric representations. To determine the numeric representation of a particular position value in some such embodiments, position embeddings manager 215 performs a look up on the table to find an entry that matches the position value and converts the position value to the numeric representation specified by the entry. After determining numeric representations for each position value in the input data, position embeddings manager 215 sends them to embeddings aggregator 225.

Token type embeddings manager 220 handles the determination of sentence embeddings for sentence values in input data. For example, once token type embeddings manager 220 receives input data from token selector 205, token type embeddings manager 220 converts each sentence value in the input data to a numeric representation using an embedding space generated from a corpus of sentence values. The numeric representation of a sentence value can be a vector of 128, 256, 1024, 2048, 4096, etc. floating-point numbers. In some embodiments, the sentence value embedding space is implemented as a table with entries that map sentence values to their corresponding numeric representations. To determine the numeric representation of a particular sentence value in some such embodiments, token type embeddings manager 220 performs a look up on the table to find an entry that matches the sentence value and converts the sentence value to the numeric representation specified by the entry. Once token type embeddings manager 220 determines numeric representations for each sentence value in the input data, token type embeddings manager 220 sends them to embeddings aggregator 225.

Embeddings aggregator 225 is configured to calculate aggregate embeddings. For example, embeddings aggregator 225 may receive token embeddings from token embeddings manager 210, position embeddings from position embeddings manager 215, and sentence embeddings from token type embeddings manager 220. Upon receiving the data from each of these components, embeddings aggregator 225 calculates an aggregate embedding for each token in the input data by adding the token embedding of the token, the position embedding associated with the token, and the sentence embedding associated with the token. Thus, the aggregate embedding for a token is a single numeric representation for the token, the position value associated with the token, and the sentence value associated with the token. Finally, embeddings aggregator 225 outputs the calculated aggregate embeddings as aggregate embeddings 235. In some embodiments, aggregate embeddings 235 is implemented in the form of an S×H array of vectors (e.g. a matrix). As such, the array may represent the sequence of tokens in input data 230 where the tokens are encoded representations of words, position values, and sentence values. For an S×H array, S can be the length (e.g., the total number of tokens) in a sequence of tokens and H can be the total number of numeric values in a vector used to represent a token. For example, if a token is represented using a vector of 1024 floating-point numbers, H is 1024.

Figure 3:
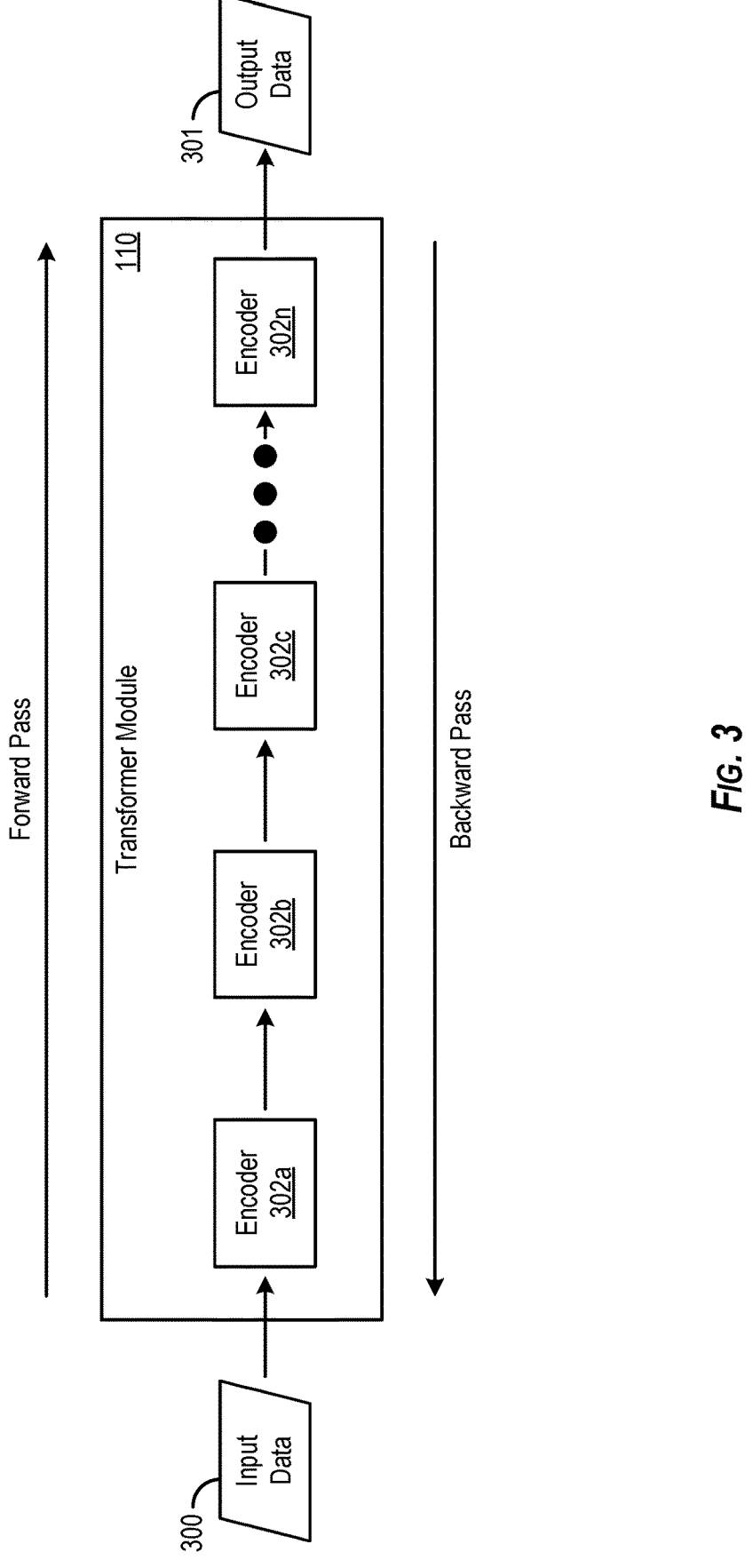
FIG. 3 illustrates an architecture of the transformer module illustrated in FIG. 1 according to some embodiments.

FIG. 3 illustrates an architecture of transformer module 110 according to some embodiments. As shown, transformer module 110 includes a plurality of encoders 302a-n. FIG. 3 depicts transformer module 110 receiving input data 300 (e.g., a sequence of tokens) and generating output data 301 during a forward pass (also referred to as a feed forward pass) through transformer module 110. In this example, input data 300 is processed by each encoder 302 in the plurality of encoders 302a-n in a sequential manner. Each of the encoders 302a-n may include a self-attention block and a feed-forward neural network. When an encoder 302 processes a piece of data in input data 300 (e.g., a token in a sequence of tokens) during the forward pass, the self-attention block of the encoder 302 may enable the encoder 302 to look at other data in input data 300 (e.g., other tokens in the sequence of tokens). The feed-forward neural network in the encoder 302 can then process and forward the output of the self-attention block to the next encoder 302 in the plurality of encoders 302a-n. A set of attention vectors may be generated from the output of the final encoder in the plurality of encoders 302a-n (e.g., encoder 302n). In the forward pass, the final encoder 302 output data 301 to output data processor 115.

Transformer module 110 can received loss values (e.g., differences) from output data processor 115 for a backward pass through transformer module 110. During this backward pass, transformer module 110 can use the loss values to adjust weights of encoders 302a-n during the backward pass through transformer module 110. In some embodiments, transformer module 110 uses a back propagation technique to adjust the weights based on the loss values.

Figure 4:
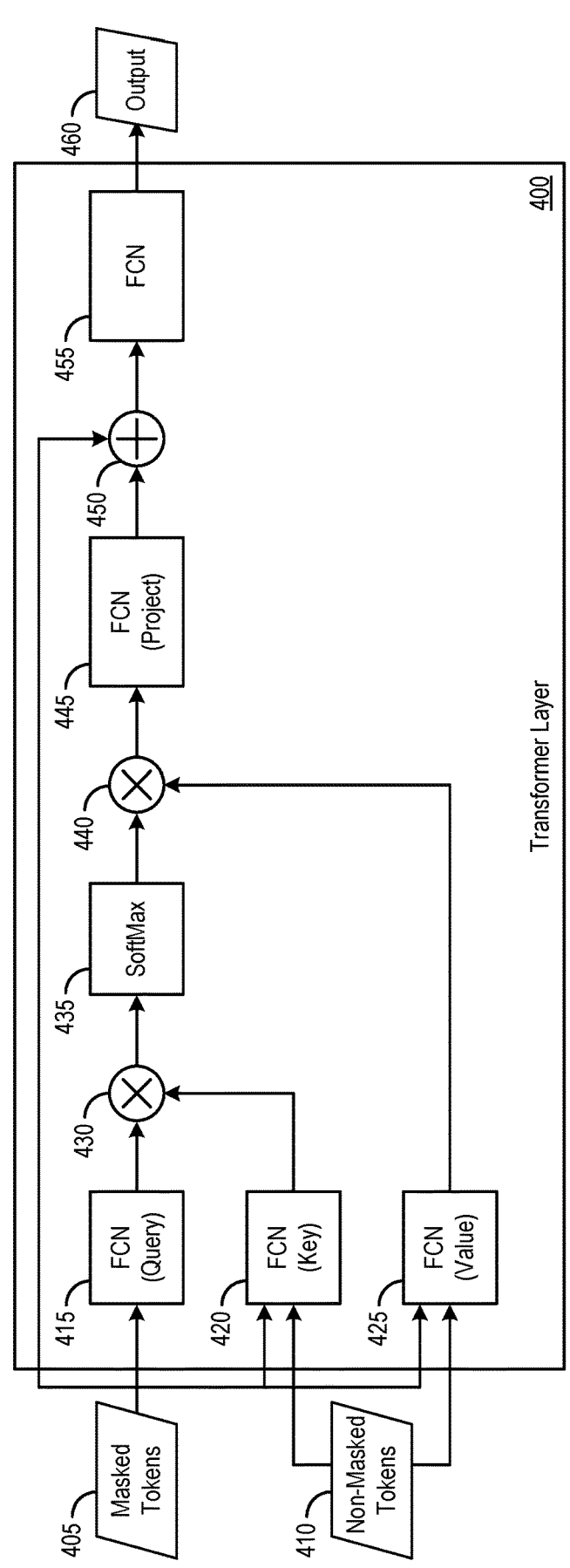
FIG. 4 illustrates a data flow through an example transformer layer according to some embodiments.

FIG. 4 illustrates a data flow through an example transformer layer 400 according to some embodiments. In some embodiments, transformer layer 400 can be used to implement any of the encoders 302a-n As depicted, transformer layer 400 includes fully connected networks (FCNs) 415, 420, 425, 445, and 455; operator 430, 440, and 450; and SoftMax 435.

The data flow starts by transformer layer 400 receiving masked tokens 405 and non-masked tokens 410 (e.g., from a previous transformer layer). For this example, non-masked tokens 410 are tokens in a sequence of tokens (e.g., words in a set of sentences provided as input to input data processor 105) and masked tokens 405 are tokens in the sequence of tokens that were selected to be masked and replaced a defined token value indicating that a token is a masked token.

FIG. 5 illustrates an example input data 500 according to some embodiments. Specifically, input data 500 is the input data that will be used for this example data flow. Here, an input data processor (e.g., input data processor 105) coupled to a transformer module (e.g., transformer module 110) in which transformer layer 400 is included receives input data 500. For this example, input data 500 is used to store the following two sentences: "To be or not to be. That is the question." As shown, input data 500 includes a sequence of tokens 505, a set of position values 510, and a set of sentence values 515. The sequence of tokens 505 includes special tokens STRT and SEP that each has different defined values. A STRT token may be used to indicate the beginning of input data 500. A SEP token can be used to indicate the end of a sentence.

The set of position values 510 includes a position value for each token in the sequence of tokens 505. As explained above, a position value can represent the relative position of a particular token in a sequence of tokens. In this example, position values 0-12 are used to represent the relative positions of tokens in the sequence of tokens 505. The set of sentence values 515 includes a sentence value for each token in the sequence of tokens 505. As described above, a sentence value may represent a sentence to which a token in the sequence of tokens belongs. For this example, sentence values 0 and 1 are used to represent the first and second sentences stored in input data 500.

FIG. 6 illustrates input data 500 with some tokens masked according to another embodiment. In this example, token selector 205 has selected the tokens "or" and "question" to be masked. Thus, as shown in FIG. 6, token selector 205 has replaced the selected tokens with a special MASK token, which indicates that the corresponding token is a masked token. In addition, token selector 205 has added label data that includes the actual values of the masked tokens to input data 500. As shown, the label data for masked tokens is depicted as token labels 605. For this example data flow, masked tokens 405 includes the aggregate embeddings representing these two masked tokens. Non-masked tokens 410 includes the aggregate embeddings representing the remaining tokens in input data 500.

Returning to FIG. 4, masked tokens 405 may be a K×H matrix where K is the number of masked tokens in the sequence of tokens and H is the total number of numeric values in a vector (e.g., an aggregate embedding) used to represent a token. Non-masked tokens 405 can be an L×H matrix where L is the number of non-masked tokens in the sequence of tokens and H is the total number of numeric values in a vector (e.g., an aggregate embedding) used to represent a token. Masked tokens 405 and non-masked tokens 410 may be a single an S×H matrix (e.g., when they are provided to FCN 420 and FCN 425 as inputs) where S is the number of tokens in the sequence of tokens and H is the total number of numeric values in a vector (e.g., an aggregate embedding) used to represent a token.

When FCN 415 receives masked tokens 405, FCN 415 generates a query matrix based on masked tokens 405. In some embodiments, the query matrix may include current position-word vectors in the input sequence. FCN 415 can generate the query matrix by multiplying masked tokens 405 with a weight matrix. FCN 415 outputs the query matrix to operator 430.

Upon receiving masked tokens 405 and non-masked tokens 410, FCN 420 generates a key matrix based on the masked tokens 405 and non-masked tokens 410. In some embodiments, the key matrix may include all the position-word vectors in the input sequence. FCN 420 can generate the key matrix by multiplying masked tokens 405 and non-masked tokens 410 with a weight matrix. Next, FCN 420 outputs the key matrix to operator 430.

Operator 430 is configured to generate an attention weight matrix based on the query matrix received from FCN 415 and the key matrix received from FCN 420. In some embodiments, the attention weight matrix may represent how much particular tokens in a sequence of tokens relate to other tokens in the sequence. Operator 430 can generate the attention weight matrix by performing a dot product operation between the query matrix and a transpose of the key matrix. Then, operator 430 sends the attention weight matrix to SoftMax 435.

SoftMax 435 is responsible for generating a normalized attention weight matrix. For instance, when SoftMax 435 receives the attention weight matrix from operator 430, SoftMax 435 employs a SoftMax operation to scale the weights values in the attention weight matrix to values that are between 0 and 1. SoftMax 435 outputs the normalized attention weight matrix to operator 440.

After FCN 425 receives masked tokens 405 and non-masked tokens 410, FCN 420 generates a value matrix based on the masked tokens 405 and non-masked tokens 410. In some embodiments, the value matrix may include all the position-word vectors in the input sequence. FCN 425 may generate the value matrix by multiplying masked tokens 405 and non-masked tokens 410 with a weight matrix. FCN 425 then outputs the value matrix to operator 440.

Operator 440 is configured to generate a weighted value matrix based on the normalized attention weight matrix received from SoftMax 435 and the value matrix received from FCN 425. In some embodiments, the weighted value matrix represents how different positions of the input sequence relate to one another. Operator 440 can generate the weighted value matrix by performing a dot product operation between the normalized attention weight matrix and the value matrix. Next, operator 440 outputs the weighted value matrix to FCN 445.

FCN 445 is configured to perform projection operations on the weighted value matrix received from operator 440, which FCN 445 sends to operator 450. Here, operator 450 aggregates masked tokens 405 and the matrix received from FCN 445 together and normalizes the resulting aggregation, which operator 450 sends to FCN 455. Here, FCN 455 is responsible for implementing a feed-forward neural network that generates output 460. In this example, output 460 is a K×H matrix that includes a vector of values (e.g., floating point numbers) for each token in masked tokens 405. Output 460 is provided to the next transformer layer. For instance, if output 460 is generated by encoder 302*b*, then encoder 302*b* provides output 460 as an input to encoder 302*c*.

In some embodiments where the layers of a transformer module (e.g., transformer module 110) are implemented using transformer layer 400, the output generated by the transformer module during a forward pass is a K×H matrix that includes a vector of values (e.g., floating point numbers) for each masked token in the sequence of tokens. Although all the tokens in the sequence of tokens are used to determine the correlation of tokens with respect to the masked tokens (e.g., via FCNs 415, 420, and 425), the output generated by the transformer model is associated with just the masked tokens.

Figure 7:
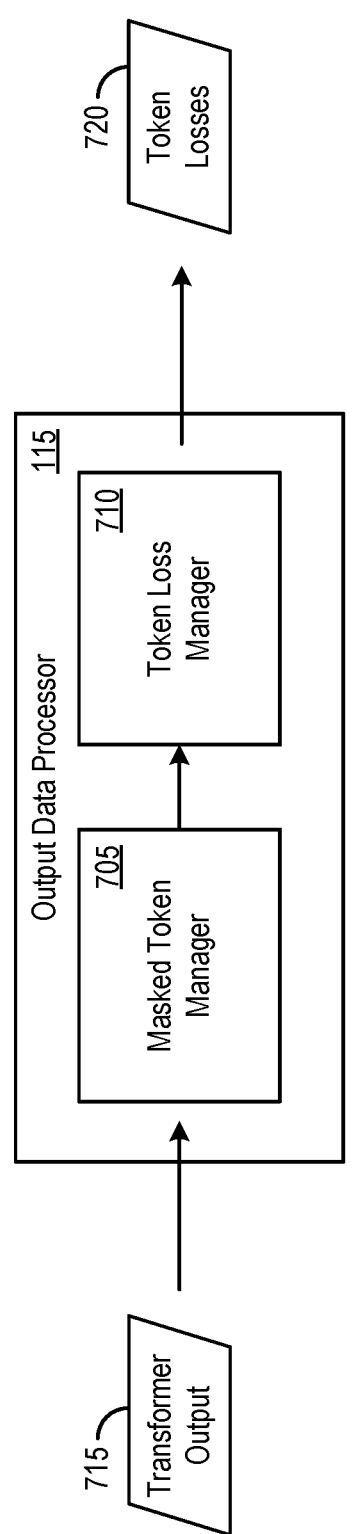
FIG. 7 illustrates an architecture of the output data processor illustrated in FIG. 1 according to some embodiments.

FIG. 7 illustrates an architecture of output data processor 115 according to some embodiments. As illustrated, output data processor 115 includes masked token manager 705 and token loss manager 710. Masked token manager 705 receives transformer output array 720 as input. In this example, transformer output 720 is a K×H matrix where K is the number of masked tokens in the sequence of tokens and H is the total number of numeric values in a vector used to represent a token. Masked token manager 705 is configured to predict tokens for masked tokens. For instance, transformer output 210 includes vector representations of K masked tokens. Next, masked token manager 705 performs a set of projection functions on the vector representations to determine probabilities associated with a corpus of tokens (e.g., a vocabulary of words) for each masked token. For each masked token, masked token manager 705 selects the token having the highest probability as being the token predicted for the masked token. After predicting tokens for masked tokens, masked token manager 705 sends the predicted tokens to Token loss manager 710.

Token loss manager 710 is responsible for determining token losses. For instance, when token loss manager 710 receives predicted tokens for masked tokens from masked token manager 705, token loss manager 710 calculates differences (e.g., errors) between the predicted tokens and the actual values of the masked tokens (e.g., stored in label data). The calculated differences are depicted in FIG. 7 as token losses 720. Token loss manager 710 may send token losses 720 to transformer module 110, which transformer module 110 uses to adjust its weights.

The examples and embodiments described above by reference to FIGS. 3-7 show how a transformer module can be configured to generate data for only masked tokens (e.g., transformer output 715) based on data associated with masked tokens and non-masked tokens. In some embodiments, a transformer module may be configure to generate data for masked tokens and some non-masked tokens. Referring to FIG. 4 as an example, in some such embodiments, masked tokens 405 and non-masked tokens 410 are processed through transformer layer 400 in the same fashion as that described above by reference to FIG. 4 except FCN 415 received masked tokens 405 and a proportion of non-masked tokens 41. The output of transformer layer 400 is output data associated with masked tokens 405 as well as the proportion of non-masked tokens 410. As such, the output generated by the transformer module would also include data associated with masked tokens 405 and the proportion of non-masked tokens 410.

In some embodiments, the training of transformer module 110 can be divided into several phases. In the first phase, the layers of transformer module 110 are configured to operate like the example data flow described above by reference to FIG. 4. For each subsequent phase, an increasing number or proportion of tokens from non-masked tokens 410 are used along with masked tokens 405 as input to FCN 415 and propagated through transformer layer 400. For example, masked tokens 405 and 10% of non-masked tokens 410 can be inputs to FCN 415 in a second phase, masked tokens 405 and 20% of non-masked tokens 410 can be inputs to FCN 415 in a third phase, masked tokens 405 and 30% of non-masked tokens 410 can be inputs to FCN 415 in a fourth phase, etc. In some embodiments, masked tokens 405 and 100% of non-masked tokens 410 can be inputs to FCN 415 in the last phase.

FIG. 8 illustrates a process 800 for training a masked language model according to some embodiments. In some embodiments, system 100 performs process 800. Process 800 begins by receiving, 810, a sequence of tokens for training a transformer model. Referring to FIGS. 1, 2, and 5 as an example, input data processor 105 can receive token data 230, which is a sequence of tokens for training transformer module 110.

Next, process 800 selects, at 820, a defined proportion of the sequence of tokens. Referring to FIGS. 1, 2, and 5 as an example, token selector 205 may select fifteen percent (15%) of sequence of tokens 505 in input data 500. Specifically, token selector 205 selects the tokens representing the words "or" and "question" in sequence of tokens 505. Process 800 then replaces, at 830, each value of the defined proportion of the sequence of tokens with a defined value. Referring to FIGS. 1, 2, and 6 as an example, token selector 205 may replace the selected tokens with a MASK token that indicates that the token is a masked token.

Finally, process 800 trains, at 840, the transformer model by using the sequence of tokens to train the transformer model during a forward pass and using a subset of the sequence of tokens that includes the defined proportion of the sequence of tokens to train the transformer model during a backward pass. Referring to FIGS. 4 and 6 as an example, in some embodiments where the layers in transformer module 110 are implemented by transformer layer 400, masked tokens 405 and non-masked tokens 410 are processed through each of the layers during a forward pass in the manner described above by reference to FIG. 4. The output of transformer module 110 includes vectors for just the masked tokens, which are then used in a backward pass to adjust weights in transformer module 110.

The techniques describe above may be implemented in a wide range of computer systems configured to process neural networks. FIG. 9 depicts a simplified block diagram of an example computer system 900, which can be used to implement the techniques described in the foregoing disclosure. As shown in FIG. 9, computer system 900 includes one or more processors 902 that communicate with a number of peripheral devices via a bus subsystem 904. These peripheral devices may include a storage subsystem 906 (e.g., comprising a memory subsystem 908 and a file storage subsystem 910) and a network interface subsystem 916. Some computer systems may further include user interface input devices 912 and/or user interface output devices 914.

Bus subsystem 904 can provide a mechanism for letting the various components and subsystems of computer system 900 communicate with each other as intended. Although bus subsystem 904 is shown schematically as a single bus, alternative embodiments of the bus subsystem can utilize multiple busses.

Network interface subsystem 916 can serve as an interface for communicating data between computer system 900 and other computer systems or networks. Embodiments of network interface subsystem 916 can include, e.g., Ethernet, a Wi-Fi and/or cellular adapter, a modem (telephone, satellite, cable, ISDN, etc.), digital subscriber line (DSL) units, and/or the like.

Storage subsystem 906 includes a memory subsystem 908 and a file/disk storage subsystem 910. Subsystems 908 and 910 as well as other memories described herein are examples of non-transitory computer-readable storage media that can store executable program code and/or data that provide the functionality of embodiments of the present disclosure.

Memory subsystem 908 includes a number of memories including a main random access memory (RAM) 918 for storage of instructions and data during program execution and a read-only memory (ROM) 920 in which fixed instructions are stored. File storage subsystem 910 can provide persistent (e.g., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 900 is illustrative and many other configurations having more or fewer components than system 900 are possible.

FIG. 10 illustrates a neural network processing system according to some embodiments. In various embodiments, neural networks according to the present disclosure may be implemented and trained in a hardware environment comprising one or more neural network processors. A neural network processor may refer to various graphics processing units (GPU) (e.g., a GPU for processing neural networks produced by Nvidia Corp®), field programmable gate arrays (FPGA) (e.g., FPGAs for processing neural networks produced by Xilinx®), or a variety of application specific integrated circuits (ASICs) or neural network processors comprising hardware architectures optimized for neural network computations, for example. In this example environment, one or more servers 1002, which may comprise architectures illustrated in FIG. 9 above, may be coupled to a plurality of controllers 1010(1)-1010(M) over a communication network 1001 (e.g. switches, routers, etc.). Controllers 1010(1)-1010(M) may also comprise architectures illustrated in FIG. 9 above. Each controller 1010(1)-1010(M) may be coupled to one or more NN processors, such as processors 1011(1)-1011(N) and 1012(1)-1012(N), for example. NN processors 1011(1)-1011(N) and 1012(1)-1012(N) may include a variety of configurations of functional processing blocks and memory optimized for neural network processing, such as training or inference. The NN processors are optimized for neural network computations. Server 1002 may configure controllers 1010 with NN models as well as input data to the models, which may be loaded and executed by NN processors 1011(1)-1011(N) and 1012(1)-1012(N) in parallel, for example. Models may include layers and associated weights as described above, for example. NN processors may load the models and apply the inputs to produce output results. NN processors may also implement training algorithms described herein, for example.

FURTHER EXAMPLE EMBODIMENTS

In various embodiments, the present disclosure includes systems, methods, and apparatuses for training masked language models based on partial sequences of tokens. The techniques described herein may be embodied in non-transitory machine-readable medium storing a program executable by a computer system, the program comprising sets of instructions for performing the techniques described herein. In some embodiments, a system includes a set of processing units and a non-transitory machine-readable medium storing instructions that when executed by at least one processing unit in the set of processing units cause the at least one processing unit to perform the techniques described above. In some embodiments, the non-transitory machine-readable medium may be memory, for example, which may be coupled to one or more controllers or one or more artificial intelligence processors, for example.

The following techniques may be embodied alone or in different combinations and may further be embodied with other techniques described herein.

For example, in one embodiment, the present disclosure includes a non-transitory machine-readable medium storing a program executable by at least one processing unit of a device. The program comprises sets of instructions for receiving a sequence of tokens for training a transformer model; selecting a defined proportion of the sequence of tokens; replacing each value of the defined proportion of the sequence of tokens with a defined value; and training the transformer model by using the sequence of tokens to train the transformer model during a forward pass and using a subset of the sequence of tokens that includes the defined the proportion of the sequence of tokens to train the transformer model during a backward pass.

In one embodiment, using the subset of the sequence of tokens to train the transformer model during the backward pass comprises calculating a set of losses based on the subset of the sequence of tokens.

In one embodiment, the forward pass is a first forward pass, the backward pass is a first backward pass, and the sequence of tokens is a first sequence of tokens. The present disclosure further comprises receiving a second sequence of tokens for training the transformer model; selecting a defined proportion of the second sequence of tokens; replacing each value of the defined proportion of the second sequence of tokens with the defined value; and training the transformer model by using the second sequence of tokens to train the transformer model during a second forward pass and using a subset of the second sequence of tokens that includes the defined the proportion of the second sequence of tokens to train the transformer model during a second backward pass.

In one embodiment, the subset of the second sequence of tokens further includes a set of tokens in the defined proportion of the second sequence of tokens.

In one embodiment, a first set of tokens included in the subset of the first sequence of tokens are not included in the defined proportion of the first sequence of tokens and a second set of tokens included in the subset of the second sequence of tokens are not included in the defined proportion of the second sequence of tokens.

In one embodiment, a number of tokens in the first set of tokens is equal to a number of tokens in the second set of tokens.

In one embodiment, a number of tokens in the first set of tokens is less than a number of tokens in the second set of tokens.

In one embodiment, the subset of the second sequence of tokens that includes each token in the second sequence of tokens.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A non-transitory machine-readable medium storing a program executable by at least one processing unit of a device, the program comprising sets of instructions for:

receiving a first sequence of tokens for training a transformer model;

selecting a defined proportion of the first sequence of tokens;

creating first masked tokens by replacing each value of the defined proportion of the first sequence of tokens with a defined value;

during a first forward pass, using the first sequence of tokens to train the transformer model;

during a first backward pass, using a first subset of the first sequence of tokens to train the transformer model, the first subset comprising the first masked tokens and a first number of unmasked tokens;

receiving a second sequence of tokens for training the transformer model, the second sequence of tokens being of equal length to the first sequence of tokens;

selecting a defined proportion of the second sequence of tokens;

creating second masked tokens by replacing each value of the defined proportion of the second sequence of tokens with the defined value;

during a second forward pass subsequent to the first forward pass, using the second sequence of tokens to train the transformer model;

during a second backward pass, using a second subset of the second sequence of tokens to train the transformer model, the second subset comprising the second masked tokens and a second number of unmasked tokens that is larger than the first number of unmasked tokens.

2. The non-transitory machine-readable medium of claim 1, wherein using the first subset of the first sequence of tokens to train the transformer model during the first backward pass comprises calculating a set of losses based on the first subset of the first sequence of tokens.

3. The non-transitory machine-readable medium of claim 1, wherein a first set of tokens included in the first subset of the first sequence of tokens are not included in the first masked tokens.

4. The non-transitory machine-readable medium of claim 1, wherein the program further comprises instructions for:

across multiple training iterations respectively comprising at least one forward pass and at least one backward pass, progressively increasing a proportion of unmasked tokens used in the at least one backward pass.

5. A method comprising:

receiving a first sequence of tokens for training a transformer model;

selecting a defined proportion of the first sequence of tokens;

creating first masked tokens by replacing each value of the defined proportion of the first sequence of tokens with a defined value;

during a first forward pass, using the first sequence of tokens to train the transformer model;

during a first backward pass, using a first subset of the first sequence of tokens to train the transformer model, the first subset comprising the first masked tokens and a first number of unmasked tokens;

receiving a second sequence of tokens for training the transformer model;

selecting a defined proportion of the second sequence of tokens;

creating second masked tokens by replacing each value of the defined proportion of the second sequence of tokens with the defined value;

during a second forward pass subsequent to the first forward pass, using the second sequence of tokens to train the transformer model;

during a second backward pass, using a second subset of the second sequence of tokens to train the transformer model, the second subset comprising the second masked tokens and a second number of unmasked tokens that is larger than the first number of unmasked tokens.

6. The method of claim 5, wherein using the first subset of the first sequence of tokens to train the transformer model during the first backward pass comprises calculating a set of losses based on the first subset of the first sequence of tokens.

7. The method of claim 5, wherein a first set of tokens included in the first subset of the first sequence of tokens are not included in the first masked tokens.

8. The method of claim 5, further comprising:

across multiple training iterations respectively comprising at least one forward pass and at least one backward pass, progressively increasing a proportion of unmasked tokens used in the at least one backward pass.

9. A system comprising:

a set of processing units; and a non-transitory machine-readable medium storing instructions that, when executed by at least one processing unit in the set of processing units, cause the at least one processing unit to:

receive a first sequence of tokens for training a transformer model;

select a defined proportion of the first sequence of tokens;

create first masked tokens by replacing each value of the defined proportion of the first sequence of tokens with a defined value; and during a first forward pass, using the first sequence of tokens to train the transformer model;

during a first backward pass, using a first subset of the first sequence of tokens to train the transformer model, the first subset comprising the first masked tokens and a first number of unmasked tokens;

receive a second sequence of tokens for training the transformer model;

select a defined proportion of the second sequence of tokens;

create second masked tokens by replacing each value of the defined proportion of the second sequence of tokens with a defined value; and during a second forward pass subsequent to the first forward pass, use the second sequence of tokens to train the transformer model;

during a second backward pass, use a second subset of the second sequence of tokens to train the transformer model, the second subset comprising the second masked tokens and a second number of unmasked tokens that is larger than the first number of unmasked tokens.

10. The system of claim 9, wherein using the first subset of the first sequence of tokens to train the transformer model during the first backward pass comprises calculating a set of losses based on the first subset of the first sequence of tokens.

11. The system of claim 9, wherein the instructions cause the at least one processing unit to:

across multiple training iterations respectively comprising at least one forward pass and at least one backward pass, progressively increase a proportion of unmasked tokens used in the at least one backward pass.

* * * * *